United States Patent [19]
Roeske

[11] 3,739,578

[45] June 19, 1973

[54] SYNCHRONIZING CLUTCHING ARRANGEMENT FOR HYDROSTATIC TRANSMISSION

[75] Inventor: Eugene A. Roeske, Chicago, Ill.

[73] Assignee: Wire Sales Company, Chicago, Ill.

[22] Filed: Mar. 3, 1972

[21] Appl. No.: 231,537

[52] U.S. Cl. .................... 60/444, 60/448, 60/465, 60/468, 60/489
[51] Int. Cl. ........................................... F16h 39/10
[58] Field of Search ............ 60/53 A, 53 R, 52 SR, 60/52 B, DIG. 2

[56] References Cited
UNITED STATES PATENTS

| 3,365,886 | 1/1968 | Moon | 60/52 SR UX |
| 3,434,283 | 3/1969 | Piret | 60/DIG. 2 |
| 3,438,201 | 4/1969 | Nash et al. | 60/DIG. 2 |

*Primary Examiner*—Edgar W. Geoghegan
*Attorney*—C. Frederick Leydig, Richard L. Voit, Edward W. Osann, Jr., et al.

[57] ABSTRACT

A synchronized clutching arrangement for a transmission having an hydraulically interconnected pump and motor of the swash plate type with provision for short circuiting the hydraulic connection for effectively declutching the motor, including a servo device connected to the swash plate and a tachometer on the output shaft connected to the input of the servo device so that when the transmission is unclutched the servo device thereafter trackingly maintains the swash plate at an angle corresponding to the currently existing speed of the output shaft. A source of variable control voltage is provided for the servo calibrated in terms of output speed with means for simultaneously clutching the transmission and switching the input of the servo device from the tachometer to the source of variable control voltage for shockless clutching followed by automatic subsequent change of the speed of the output shaft to the speed for which the variable control voltage has been set. Means are provided for braking the load to a stop by reducing the control voltage to zero with the transmission in clutched condition or for allowing the load to coast to a stop by putting the transmission into its unclutched condition. The arrangement is failsafe in that the controls may be operated in any desired sequence and regardless of the condition of the load without establishing an unwanted or dangerous condition.

13 Claims, 4 Drawing Figures

United States Patent [19]
Roeske
[11] 3,739,578
[45] June 19, 1973
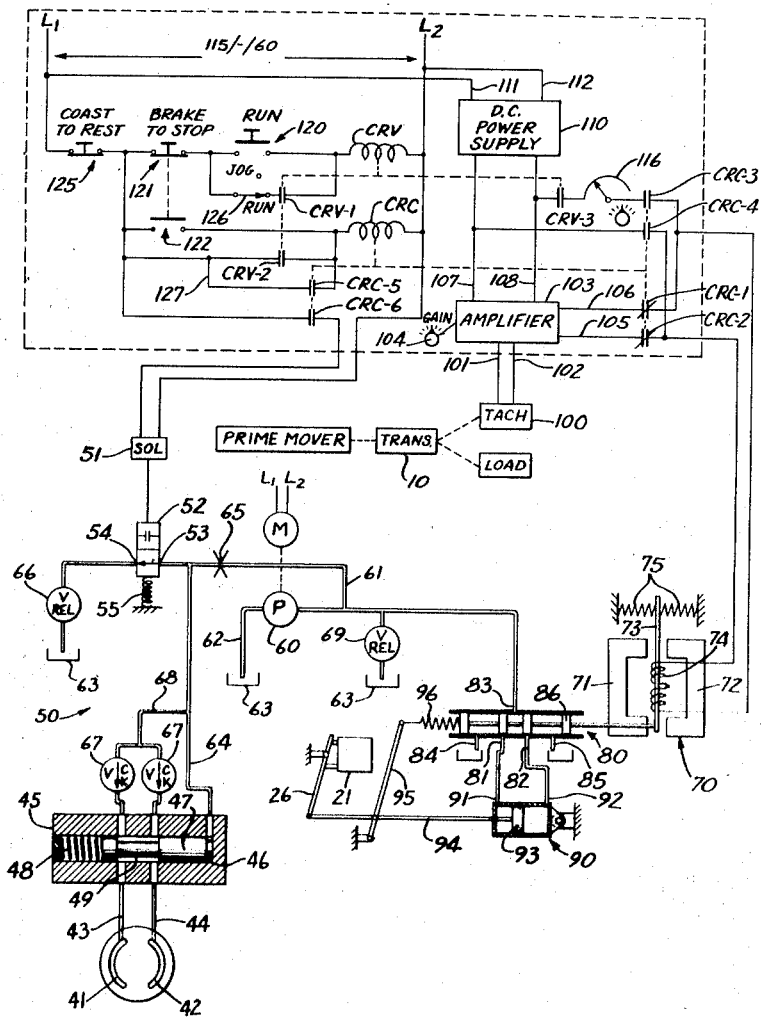

3,739,578

SYNCHRONIZING CLUTCHING ARRANGEMENT FOR HYDROSTATIC TRANSMISSION

It is known in the art to provide a transmission in the form of a variable output hydraulic pump which is hydraulically connected to a variable input hydraulic motor, the pump and motor being connected respectively to the input and output shafts. Conveniently, the pump and motor may be of the type having a plurality of pistons respectively mounted in cylindrical openings spaced in a rotary barrel and with the stroke of the pistons being determined by engaging them with a swash plate which may be adjustably angled to vary the fluid which is displaced in each revolution. Porting is provided for connecting the output of the pump to the input of the motor and for feeding fluid back again from the output of the motor to the input of the pump. Thus it is a simple matter to declutch the load by providing an hydraulic short circuit between the input and output connections of pump and motor. With such short circuit in effect no pressure difference can be developed so that the pump pumps idly, i.e., without doing any useful work, and so that the motor rotates idly with the connected load.

To determine the transmission speed ratio the swash plate associated with the pump is mounted for adjustment of angle, or the swash plates in the pump and motor are mounted for coordinated adjustment. Thus assuming that the input shaft is driven at a predetermined speed, a given angle of swash plate adjustment will correspond to a given speed at the output shaft.

A problem encountered in the operation of transmissions of this type may be illustrated by the following example: Let it be assumed that the output shaft is connected to an inertial load, that the input shaft is constantly rotated at a predetermined speed, and that the hydraulic connections are short circuited to effectively declutch the load. The load will thereupon decelerate to some lower speed. Suppose further that the transmission is then clutched to resume the driving condition. This will produce a shock in the drive system since the output shaft will tend to be initially driven at the speed for which the swash plate happens to be set, but it cannot initially rotate at such speed since the load cannot be brought up to the set speed instantaneously. The same problem is encountered in starting a load from a dead stop.

Another way of looking at the matter is that when clutching occurs the swash plates of the pump and motor should both be set so that the motor at its initially existing speed can accommodate the pressure fluid being put out by the pump at its existing speed. Thus in clutching a load from a dead stop the pump should initially be in its zero output state.

It is accordingly an object of the present invention to provide a transmission of the hydrostatic type in which clutching is effected by control of a short circuit between an hydraulic pump and motor and which may be clutched without imposing any shock upon the drive system regardless of the speed at which the output shaft is rotating at the time that clutching takes place. It is a more specific object to provide a hydrostatic transmission in which the speed of the output shaft is determined by adjustable angling of a swash plate within the transmission and in which means including a tachometer and servo device are provided for maintaining the swash plate, under declutched conditions, at a position which trackingly corresponds to the speed of the output shaft or load in readiness for clutching the load.

It is a related object of the present invention to provide a combined electro-hydraulic system for an hydrostatic transmission which includes novel servo and clutching provisions and safeguards.

It is a general object to provide a transmission and control which is highly flexible in use and which may be universally employed where it is necessary to operate a load, particularly one having high inertia, intermittently at a controlled speed and to effect prompt braking to a standstill when desired.

Other objects and advantages of the invention will become apparent upon reading the attached description and upon reference to the drawings in which.

While the invention has been described in connection with a preferred embodiment, it will be understood that I do not intend to be limited to the particular embodiment shown but intend, on the contrary, to cover the various alternative and equivalent constructions included within the spirit and scope of the appended claims.

Figure 2:
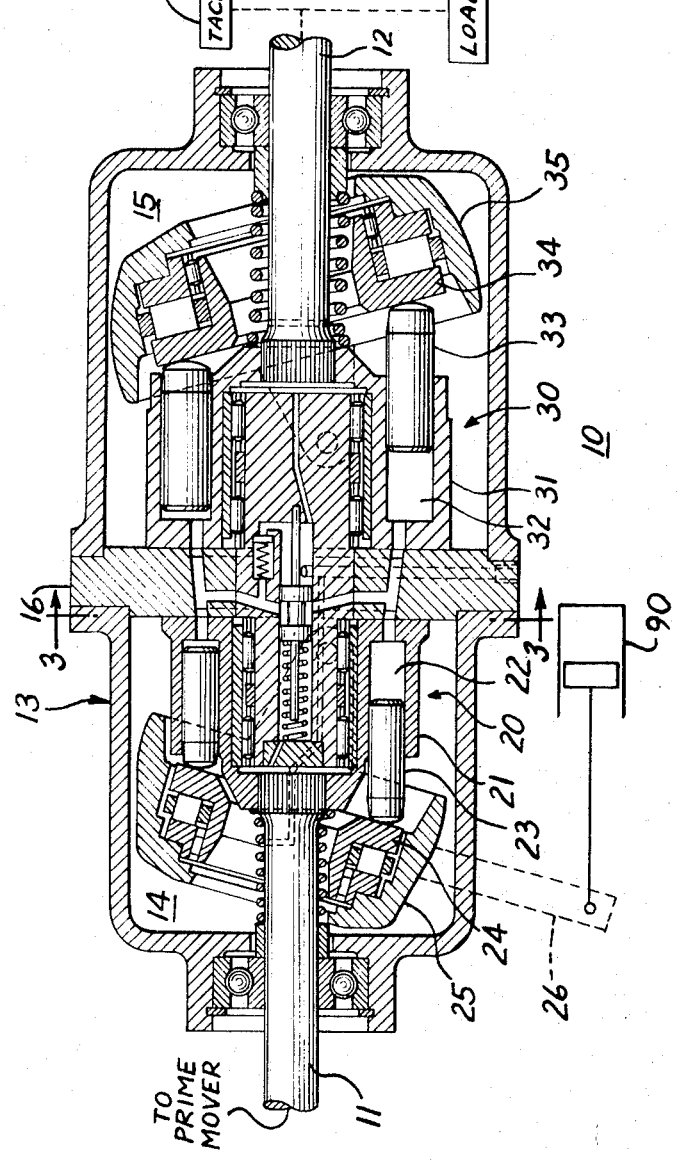
FIG. 2 is a longitudinal section showing a typical hydrostatic transmission to which the invention is applicable.

Turning now to the drawings FIG. 2 shows a typical hydrostatic transmission 10, having an input shaft 11 and an output shaft 12 projecting from opposite ends of a housing 13 which may be of cylindrical shape. The housing includes a left hand compartment 14 and a right hand compartment 15 separated by an aperture plate 16 which is sometimes referred to as a control disc. Mounted in the left hand compartment is a pump assembly 20 including a rotor 21 having a series of axially extending cylindrical openings 22 evenly distributed about the periphery and fitted with respective pistons 23. The presented ends of the pistons engage an angularly mounted swash plate 24, of disc shape, which is supported in suitable bearings in a swash plate carrier 25. The latter is mounted in a pair of trunion bearings or the like (not shown) and is provided with a rigidly connected control arm 26 for angular adjustment by means to be described.

Thus, as the input shaft is rotated, bodily rotating the rotor 21, the pistons reciprocate back and forth for pumping of a contained body of hydraulic fluid.

Turning attention next to the remaining or motor compartment 15, it includes a motor assembly 30, including a rotor 31 having cylinders 32 fitted with pistons 33 engaging a swash plate 34 mounted in the angularly adjustable carrier 35. The latter may be adjustable for swinging movement about an axis which is transverse to the central axis of the transmission but, for the sake of simplicity, it will be assumed that the carrier 35 is fixedly mounted.

Generally stated, the hydraulic fluid which is pumped by the pump rotor 21 causes the pistons 23 to react against the swash plate 24 to pump fluid at a rate which is dependent upon the angling of the swash plate. Thus when the swash plate is nearly perpendicular to the rotational axis the rate of fluid flow will be near zero whereas when the swash plate is inclined sharply in the direction of the axis, each piston will displace more hydraulic fluid in each shaft revolution to operate the motor at high speed. A wide range of output speed and torque capability are therefore available.

Turning attention more specifically to the control disc 16, arcuate collection and distribution ports are provided. The first one of these, indicated at 41, collects the hydraulic fluid at the output of the pump rotor 21 and distributes it to inlet ports formed in the presented wall of the motor rotor 31. The second collection and distribution port 42, collects the hydraulic fluid exhausted from the motor to return the same to the inlet ports of the pump.

The arcuate ports 41,42 have respective bypass connections 43, 44 which lead to a clutching valve 45 having a cylindrical chamber 46 in which a spool valve element 47 is slideably fitted, the spool being biased to a normal declutching position by a spring 48, thereby to provide a direct connection 49 for bypassing, or short circuiting, of the pumped fluid. Thus under declutched conditions fluid is directly bypassed from the port 41 to the port 42 reducing the pressure differential across both pump and motor to substantially zero, so that no torque is transmitted and so that the output shaft may rotate freely. However, when pressure fluid is applied to the chamber 46 of the valve, movement of the spool 47 to its alternate left-hand, or blocking, position permits the transmission to perform its normal speed-changing function. For details of the hydrostatic transmission of the general type disclosed reference is made to the following prior U. S. Pat. Nos.: Ritter 3,046,744, Ritter 3,131,540, Allgaier et al. 3,313,108, Allgaier et al. 3,175,365 and Ritter 3,527,145.

For the purpose of actuating the clutching valve 45 for clutching purposes and for venting it to declutch, an hydraulic circuit 50 is provided which includes a solenoid valve 51 having a reciprocal valve member 52 cooperating with an inlet port 53 and an outlet port 54, the valve member being normally biased into the venting position shown by a spring 55.

As connected, the valve 51 is utilized for venting and blocking, respectively, the output of a pump 60. The pump, which is driven by a motor M, has a pressure or output line 61 and a sump line 62, the latter leading to a sump, or reservoir, of pressure fluid 63. The line 61, in addition to being connected to the input port 53 of the valve 51, is connected to line 64 which leads to the chamber of the clutching valve 45. Thus when the valve 51 is in the position shown, completing a straight-through venting connection, operation of the pump is ineffective to pressurize the line 64 so that the valve 45 remains in its declutched state. The amount of pressure existing in the line 64 is determined, under such conditions, by a throttling control orifice 65 and by the setting of a low pressure relief valve 66, causing the pressure to be sufficiently low so that the force of the spring 48 in the clutching valve is capable of maintaining the spool 47 in the short circuiting position shown. Hydraulic fluid is supplied to the transmission under such conditions for replenishment purposes via check valves 67 in series with a supply line 68.

When the solenoid valve 51 is energized causing the valve member to move to its opposite position, communication between valve ports 53, 54 is blocked so that pressure fluid from the pump 60, acting through lines 61, 64 is applied to the space 46 in the clutching valve causing the spool 47 to move to the left, thereby blocking flow of fluid between the ports 43, 44, establishing normal drive connection between the pump and motor, and putting the transmission in the clutched condition. The maximum pressure exerted by the pump 60 in the clutched condition is determined by a relief valve 69.

In carrying out the present invention a servo device, and associated hydraulic circuit, are provided for adjustably positioning the control arm 26 which adjusts the swash plate 24. Such servo device includes a DC torque motor 70 having pole pieces 71, 72 and a pivoted armature 73 which has a winding 74, the armature being normally centered by a centering spring 75. Connected to the armature 73 is a pilot valve 80 having output connections 81, 82, an input connection 83, and exhaust connections 84, 85, the flowthrough the connections being controlled by a spool member 86. Hydraulically connected to the pilot valve is a servo cylinder 90 having ports 91, 92 at its respective ends and a piston 93. The piston is connected by a piston rod 94 to the control arm 26. In addition, a mechanical feedback connection 95 is provided, connecting the piston rod 94 to the spool 86 of the valve via a spring 96.

In operation let it be assumed that a certain voltage is applied to the servo winding 74 resulting in flow of predetermined current causing the piston 93 to occupy the more or less central position shown. Upon an increase in current in the winding 74, resulting in counterclockwise rocking of the armature, the spool 86 moves to the right thereby admitting pressure fluid to the right-hand end of the servo actuator 90, of the general type disclosed, causing the piston rod 94 to move to the left to rock the swash plate 24 to a position which is more angled in the direction of the axis, thereby to increase the pumping rate. Conversely a decrease in the current flowing through the coil 74, reacting against the magnetism of the pole pieces, causes the armature to rock in the opposite direction so that the pilot valve 80 admits pressure fluid to the left-hand end of the actuator causing the piston rod to move to the right, rocking the swash plate 24 so that it is more perpendicular to the transmission axis to decrease the pumping rate. In each instance movement of the piston via the mechanical feedback connection 95 and spring 96 causes the spool 86 to be restored to its central position to cut off further fluid flow after a change takes place so that the angle of the swash plate, and hence the speed of the output shaft, is varied in accordance with the amount of current flowing through the servo input winding 74. Servo devices operating on the principle set forth above to produce proportioned response of swash plate position in accordance with input signal are commercially available on the market, one unit being identified, for example, as Model V7058 Hydro-transmission Valve manufactured by Apparatus Controls Division of Honeywell Corporation.

In accordance with the present invention a tachometer is mechanically coupled to the output shaft of the transmission so that when the transmission is in its unclutched position an electrical output signal is produced which is amplified and fed to the input of the servo device for controlling the angle of the transmission swash plate, the rate of the amplified tachometer signal (in volts per RPM) being adjusted to such level that the swash plate is constantly and trackingly maintained at an angle which, under driving conditions, would produce the same transmission output speed, with the result that when the transmission is clutched to establish a driving connection the clutching occurs without any initial shock to the drive system. Thus referring to the schematic electrical diagram set forth in the top portion of FIG. 1, a tachometer 100 is provided having a shaft which is connected to the output shaft 12 of the transmission and which has electrical output leads 101, 102 which are connected to the input terminals of an amplifier 103. The amplifier has a gain control 104, output terminals 105, 106 and power supply connections 107, 108. The latter lead to a DC power supply 110, of the conventional rectifying type, having input leads 111, 112 which are connected to regular AC supply lines L1, L2 respectively.

The winding 74 of the control device is connected, under unclutched conditions, to the output terminal of the amplifier via normally closed contacts CRC–1, CRC–2, which may, for the moment, be disregarded. With the tachometer thus in control of the servo, the servo acts to constantly and trackingly maintain the swash plate 24 at an angle which depends upon the transmission output speed.

Figures 1, 1A:
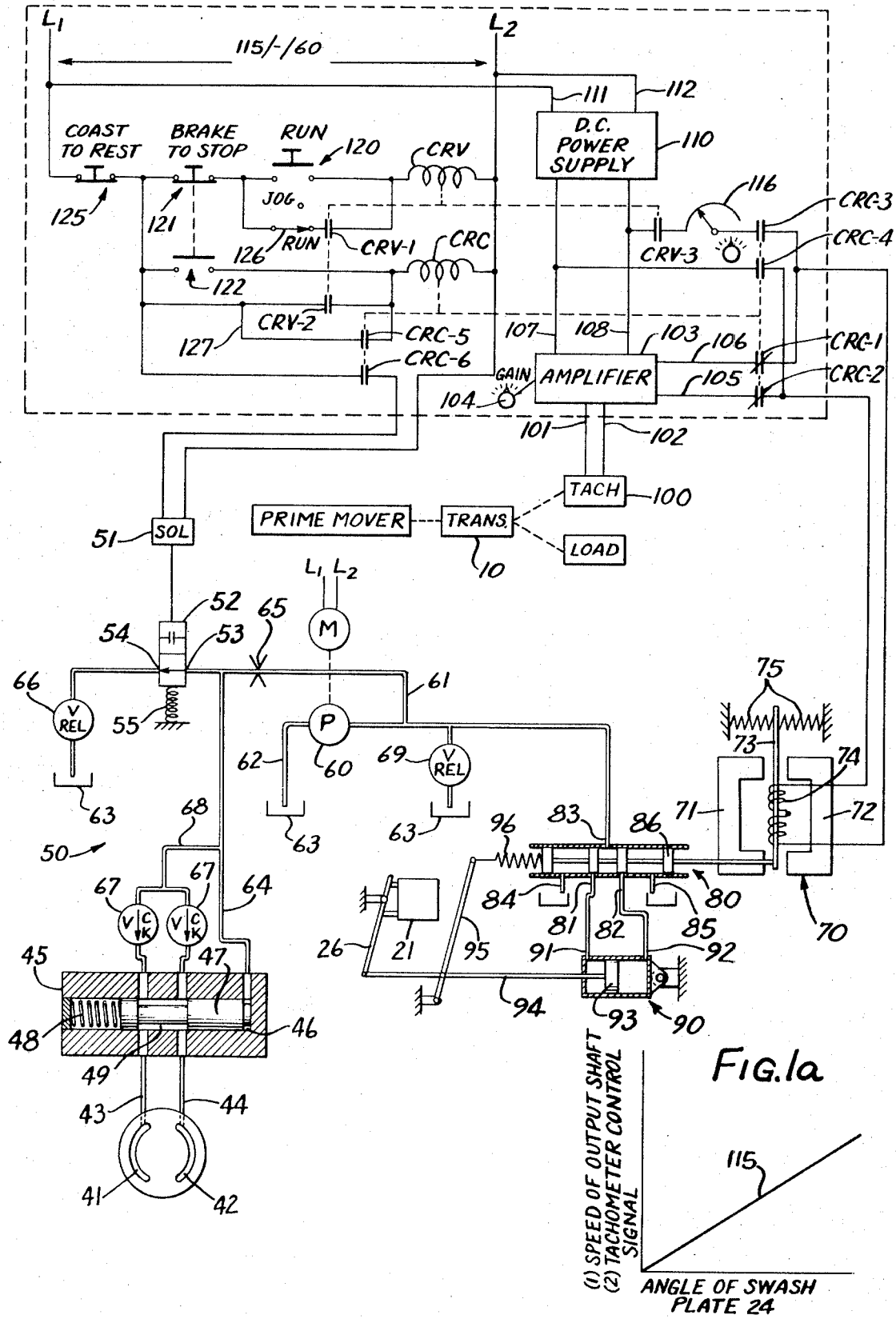
FIG. 1 is a combined electrical and hydraulic diagram schematically showing a synchronized clutching and control arrangement constructed in accordance with the present invention.
FIG. 1a shows the desired coordination between output speed and tachometer voltage and the angle of the swash plate.
Figure 3:
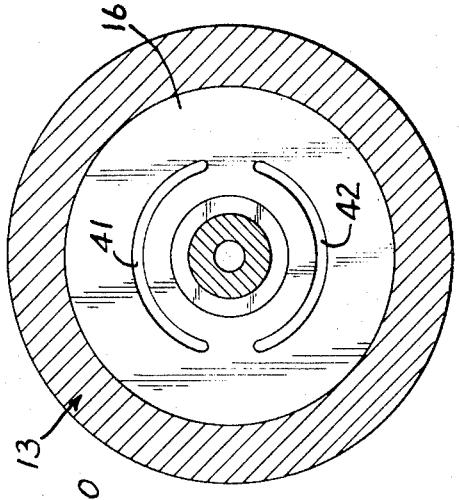
FIG. 3 is a transverse section looking along line 3—3 in FIG. 2 and showing the hydraulic connections between the pump and motor portions of the transmission.

It has been previously stated that, under driving conditions, the speed of the output shaft is related to, and depends upon, the angle of the controlling swash plate. Referring to FIG. 1a the characteristic which relates these two factors is indicated at 115. In this figure the characteristic has been shown as linear, for the sake of convenience, but it will be understood that the characteristic will, in a practical case, depart from linearity in one direction or the other to a certain extent. In carrying out the invention the rate of the tachometer signal, expressed in volts per RPM, and which appears at the amplifier output terminals, is so adjusted, by adjustment of the amplifier gain control 104, as to cause the tachometer control signal characteristic to correspond to the characteristic 115 which relates the output speed and swash plate angle under driving conditions. Obtaining coincidence of swash plate angle with the speed of the output shaft under both clutched and unclutched conditions is simplified by the fact that a output of a conventional tachometer varies linearly with the speed at which it is driven. Thus assuming that the connected amplifier 103 has substantially linear characteristics, the necessary coordination is simply a matter of adjusting the tachometer rate which is readily done by adjusting amplifier gain.

In accordance with the present invention, a control relay circuit is provided under the control of pushbuttons and having double-throw contacts for transferring control of the servo mechanism from the tachometer to a settable source of variable control voltage simultaneously with energization of the clutching solenoid so that, upon shockless clutching, the load is promptly and automatically brought to the set speed. Still further in accordance with the invention the relay circuit includes two separate relay one of which transfers control away from the tachometer at the instant of clutching and the other of which determines whether the control voltage which then becomes effective should be the set value, for driving of the load at set speed, or at zero value for braking the load to a stop.

Thus, referring to the control circuit of FIG. 1, a first relay CRV is provided having normally open contacts CRV–1, CRV–2 and CRV–3. CRV–1 is connected as a hold-in or "sealing" contact for relay CRV. Contact CRV–2 is connected as actuating contact for a second relay. CRV–3 is a contact which is connected in series with the settable source of signal voltage, here in the form of speed control potentiometer 116, and which, when in normally open condition, is effective to reduce control voltage to zero for braking purposes.

The second relay in the circuit, indicated at CRC, has, in addition to normally closed contacts CRC–1 and CRC–2 previously referred to, a pair of normally open contacts CRC–3 and CRC–4 which are in series with the settable source of control voltage 116. CRC–1 and CRC–3 on the one hand, and CRC–2 and CRC–4 on the other, form respective double-throw switches. Contact CRC–5 is used for holding in, or sealing the relay CRC. Finally, a normally open solenoid control contact CRC–6 serves to close the circuit to the clutching solenoid 51 simultaneously with switching the settable source 116 into the circuit.

For the purpose of closing the circuit to the relay CRV, a normally open "Run-Jog" pushbutton 120 is provided. In order to insure energization of the second relay, while de-energizing the first, a normally closed "Brake to Stop" pushbutton 121 is provided in series with the relay CRV, such pushbutton having a normally open contact 122 in series with the relay CRC, thereby enabling the solenoid control contact CRC–6 to be closed to effect clutching, while open circuiting the contact CRV–3 to reduce control voltage to zero for braking purposes. Finally, a "Coast to Rest" pushbutton 125 is provided having a normally closed contact which is in series with the entire control circuit and which, when pressed, drops out both of the relays, thus de-energizing the clutching solenoid and declutching the drive so that the load may coast to a stop.

To permit operation in the "jog" mode the circuit includes a "Run-Jog" selector switch 126, permitting the contact CRV–1 either to be in the circuit for sealing in the relay CRV for normal running or enabling it to be switched out of the circuit for jogging purposes. In the latter mode the load is driven at pre-set speed only during the time that the run-jog pushbutton 120 is depressed and is braked to a stop upon release thereof.

RUN CONDITION

The operation of the circuit will be apparent upon considering a typical operating sequence in the "run" mode. It will be assumed that the input shaft 11 of the transmission is rotating at rated speed, that the relays and clutch solenoid 51 are de-energized, that the hydraulic pump 60 is being driven by its motor M and that the load is rotating at some indeterminate speed. It will further be assumed that the speed control potentiometer has been set for a desired driving speed. Under such conditions the output voltage of the tachometer 100 which, amplified by the amplifier 103, comprises the speed signal, is fed to the servo winding 74 which, via the servo actuator 90, serves to position the control arm 26 of the swash plate 24 so that the swash plate occupies the same angle that it would occupy were the load being driven at such speed by the output shaft 12. Indeed, assuming that the connected load is coasting, and gradually slowing, the angling of the swash plate will be maintained, by the tachometer and servo system, at all times in accordance with the currently existing load speed and will thus track the speed as the load slows and gradually comes to a stop.

Pressing the "run" pushbutton 120 energizes the relay CRV through the normally closed pushbutton contacts 121, 125. This closes contact CRV-1, sealing in the relay CRV so that the pushbutton may be released.

Closure of contact CRV-3 switches the speed control potentiometer 116 into the control circuit. Closure of contact CRV-2 energizes the second relay CRC. When the relay CRC closes, the normally closed contacts CRC-1 and CRC-2 open, thereby to take the tachometer 100 effectively out of the circuit, and contacts CRC-3 and CRC-4 close to bring the speed control potentiometer into the circuit. Closure of contact CRC-5 has the effect of sealing in the relay CRC, and closure of contact CRC-6 energizes the solenoid 51.

Energization of the solenoid blocks further flow, or venting, through the solenoid valve, so that high pressure fluid, determined by the setting of the relief valve 69, is applied to the hydraulic line 61, 64, causing the clutching valve 45 to be actuated, the spool 47 therein moving against the biasing spring to cut off the short-circuiting flow between the ports 43,44. This couples the pump hydraulically to the motor, effectively clutching the transmission. At the same time, application of the pre-set manual control voltage to the input of the servo system causes the servo pilot valve 80 to be readjusted, resulting in movement of the piston in the servo actuator 90 to a new position, which moves the control arm 26 and its swash plate 24 to a new position which corresponds to the speed setting of the control potentiometer 116. By causing the swash plate 24 to constantly track the load speed, switching to a manually set control signal can be effected without initial shock to provide a beginning point for a prompt change in swash plate angle, with a corresponding change in output speed, until the output speed corresponds to that for which the control potentiometer has been set.

The system described is equally effective in starting the load from a dead stop. Under such conditions the initial tachometer output voltage is zero, resulting in zero voltage being applied to the input of the servo which, acting through the pilot valve 80 and servo actuator, causes the swash plate 24 to occupy its zero speed position which is perpendicular to the transmission axis. Under such conditions the stroke of the pistons in the fluid pump assembly 20 is zero, resulting in a zero initial rate of flow of fluid.

Thus when the run pushbutton 120 is pressed, closure of the contact CRC-6 and operation of the solenoid valve 51, which isolates the ports 43, 44 and couples the pump to the motor occurs at a time when the flow from the pump is zero corresponding to a zero motor speed, so that there is absence of initial shock. The simultaneous switching of the speed control potentiometer 116 into the circuit applies a finite and pre-set control voltage to the input of the servo system, resulting in movement in the pilot valve 80 and corresponding movement of the servo actuator 90 to the left thereby moving the swash plate 24 from its transverse position to an angled position which causes fluid to be actively pumped at a rate which corresponds to the desired output speed. It should be noted that the clutching is shockless regardless of what the initially existing load speed might be: whether such load speed is higher than the manually set value, lower than the manually set value, or zero.

BRAKE TO STOP CONDITION

It will be assumed that the drive system, with the "run" button 120 having been depressed, is operating normally with the load being driven at a speed for which the control potentiometer 116 has been set. Under such conditions depressing the "brake to stop" pushbutton opens contact 121, de-energizing relay CRV, so that all of the CRV contacts revert to the de-energized state shown in FIG 1. That is, opening contact CRV-1 breaks the sealing circuit and opening of contact CRV-3 open-circuits the speed control potentiometer, reducing the speed control voltage to zero.

It will be noted, however, that opening the contact 121 with accompanying opening of contact CRV-2 does not produce drop-out of the relay CRC, which remains sealed in by reason of the sealing contact CRC-5. With the relay CRC thus continuing to be energized, the solenoid control contact CR-6 continues to be closed with the result that the clutch solenoid 51 continues to be actuated and the transmission, therefore, continues to be clutched in.

Since tachometer contacts CRC-1 and CRC-2 continue to be held in open condition, the presence of zero control voltage in the servo system causes movement of the spool of the pilot valve in the "reduce speed" direction and movement of the piston in the servo actuator 90 to the right which produces movement of the swash plate gradually, but promptly, from the existing setting to the transverse position corresponding to zero pump output. Because the pump and motor continue to be clutched together, this promptly slows the motor and its connected load from the preexisting speed to a stop.

It is one of the features of the circuit that the "brake to stop" function is available to brake a coasting load even through control circuit may be de-energized. This will be made clear by assuming that both relays are de-energized, that the load is coasting, and that the tachometer amplifier and servo system are effective to cause "tracking" of the swash plate 24 with output speed. Under such conditions pressing the "brake to stop" pushbutton closes the contact 122, energizing the relay CRC without, however, energizing the relay CRV so that the potentiometer contact CRC-2 remains open, resulting in a zero control voltage. Closure of relay CRC, then, has two effects: In the first place the contacts CRC-1 and CRC-2 are opened to remove the tachometer from the circuit and contact CRC-6 closes to energize the solenoid to clutch the motor to the pump. As the servo responds to the zero control voltage, causing the swash plate 24 to assume its condition perpendicular to the transmission axis, the motor, deprived of fluid, is gradually but promptly brought to a stop along with its connected load.

JOG CONDITION

Operation in the "jog" mode comprises a combination of the "run" and "brake to stop" mode. To operate in the "jog" mode, the selector switch 126 is set to its "jog" position in which the sealing contact CRV-1 of the relay CRV is switched out of the circuit, with the result that the relay CRV is only energized as long as the pushbutton 120 is held in.

In a typical job cycle, with the swash plate tracking the output speed, pressing the pushbutton 120 energizes the relay CRC to transfer control of the swash plate from the tachometer to the control potentiometer, accompanied by operation of the solenoid 51 and switching of the clutching valve 45 to its clutched condition. The transmission thus promptly brings the load to set speed as described above under the "run" condition.

However, when the operator's finger is removed from the pushbutton 120, the relay CRV drops out, open-circuiting contact CRV-2. Relay CRC however remains energized because of its sealing contact CRC-5, keeping contact CRC-6 closed so that the transmission remains clutched, and contacts CRC-1 and CRC-2 remain open. With the control voltage thus reduced to zero, the load is braked to a stop. Reapplication of pressure to the pushbutton 120 at any time brings the load back to the set speed.

An alternate form of "jog" control is available by removing the jumper, indicated at 127, between contacts CRV-2 and CRC-5. When this is done, removal of pressure from the pushbutton 120 not only causes drop-out of relay CRV but also of relay CRC since the sealing contact CRC-5 is no longer available to hold the latter relay in. Under such circumstances the solenoid 51 is de-energized and the transmission is de-clutched so that the load coasts to stop. Concurrent closure of contacts CRC-1 and CRC-2 restores the tachometer 100 to control so that the swash plate 24 tracks the speed; as a result the pushbutton 120 may be repressed at any time to bring the load back to set speed free of any initial shock upon the drive system.

COAST TO REST CONDITION

This mode of operation, brought about by momentarily depressing the normally closed pushbutton 125 when the load is being driven is most simply understood since breaking of the circuit drops out both of the relays, declutching the transmission so that the load is free to coast to a stop. Dropout of relay CRC, by closing contacts CRC-1 and CRC-2, restores tracking control to the tachometer. As a result, if the operator should decide to terminate the coasting he need simply press the "brake to stop" pushbutton closing contact 122 energizing relay CRC which clutches the transmission and which causes zero control voltage to be applied to the servo device, so that the pump, by rapidly reducing flow of fluid to the motor stops the load. Alternatively, because of the tracking, the run pushbutton 120 may be pressed, during coasting, to clutch the transmission without shock for prompt restoration of the load to the set speed.

It will be seen, then, that the control circuit, while arrestingly simple, provides a high degree of flexibility and efficiency combined with a high degree of safety. The same relay, CRC, which controls the clutching also controls the tracking so that whenever the transmission is unclutched the swash plate must track the speed of the load. Conversely, whenever the transmission is clutched for either driving or braking purposes, the clutching occurs at a tracking position of the swash plate so that there can be no clutching shock and following which the load is either driven to set speed, or braked, depending upon whether relay CRV has, or has not, been energized. As a result many or all of the controls may be operated in any order and in quick succession and either with the load either rotating or stationary without any possible damage to the system and with assured shockless operation.

In the above description the invention has been discussed in connection with a hydrostatic transmission of the swash plate type with a control member coupled to the swash plate on the pump side. It will be apparent that the invention is not limited to this and that the two swash plates may be coupled together and connected to the same control element for opposite angular movement, relative to the axis, to effect a given change in output speed. It would be apparent to one skilled in the art that the invention, while especially applicable to hydrostatic transmissions of the type shown, may also be employed in the control of transmissions of other specific design employing a clutch and variable ratio-controlling element.

What I claim is:

1. In a variable speed drive system, the combination comprising a variable transmission having input and output shafts and including an hydraulically interconnected pump and motor mechanically coupled to the respective shafts as well as a swash plate capable of adjustable angling for varying the speed ratio, a short circuiting conduit interposed in the hydraulic connection, clutching means for opening and closing the short circuiting conduit for respectively unclutching and clutching the transmission, a servo device having an electrical input and a proportionally positioned output member, the output member being connected to the swash plate, means including a tachometer coupled to the output shaft and having an associated amplifier for feeding the input of the servo device so that when the transmission is unclutched the servo device thereafter trackingly maintains the swash plate at an angle which corresponds to the currently existing speed of the output shaft thereby to provide a shockless connection when the transmission is subsequently clutched.

2. In a variable speed drive system, the combination comprising a variable transmission having input and output shafts and including an hydraulically interconnected pump and motor mechanically coupled to the respective shafts as well as a swash plate capable of adjustable angling for varying the speed ratio, a short circuiting conduit interposed in the hydraulic connection, means including a clutching valve for opening and closing the short circuit circuiting conduit for unclutching and clutching the transmission, a servo device having an electrical input and a proportionally positioned output member, the output member being connected to the swash plate, means including a tachometer mechanically connected to the output shaft and electrically connected to the input of the servo device so that when the transmission is unclutched the servo device thereafter trackingly maintains the swash plate at an angle corresponding to the currently existing speed of the output shaft, a source of variable control voltage calibrated in terms of output speed, and means for simultaneously clutching the transmission and switching the input of the servo device from the tachometer to the source of variable control voltage for shockless clutching followed by automatic subsequent change of the speed of the output shaft to the set value.

3. The combination as claimed in claim 2 in which the simultaneous clutching and switching means includes a relay and solenoid valve in which the contacts of the relay are wired as a double-throw switch.

4. The combination as claimed in claim 2 in which means are provided for sending a zero speed signal to the servo device in lieu of the variable control voltage for braking the load to a stop.

5. The combination as claimed in claim 4 in which means are provided for open circuiting the source of variable control voltage for the purpose of producing a zero speed signal.

6. In a variable speed drive system, the combination comprising a variable transmission having input and output shafts and including an hydraulically interconnected pump and motor mechanically coupled to the respective shafts as well as a swash plate capable of adjustable angling for varying the speed ratio, a short circuiting conduit interposed in the hydraulic connection, means including a clutching valve for opening and closing the short circuiting conduit for unclutching and clutching the transmission, a servo device having an electrical input and a proportionally positioned output member, the output member being connected to the swash plate, means including a tachometer mechanically connected to the output shaft and electrically connected to the input of the servo device so that when the transmission is unclutched the servo device thereafter trackingly maintains the swash plate at an angle corresponding to the currently existing speed of the output shaft, a source of variable control voltage settable in terms of output speed, control relay means having a pushbutton for energizing the same and having electrical contacts, one of the contacts being connected to the valve and other ones of the contacts being connected as a double-throw switch for simultaneously switching the input of the servo from the tachometer to the source of variable control voltage for shockless clutching followed by automatic subsequent change of the output speed to the set value.

7. In a variable speed drive system, the combination comprising a variable transmission having input and output shafts and including an hydraulically interconnected pump and motor mechanically coupled to the respective shafts as well as a swash plate capable of adjustable angling for varying the speed ratio, a short circuiting conduit interposed in the hydraulic connection, means including a clutching valve for opening and closing the short circuiting conduit for unclutching and clutching the transmission, a servo device having an electrical input and a proportionally positioned output member, the output member being connected to the swash plate, means including a tachometer mechanically connected to the output shaft and electrically connected to the input of the servo device so that when the transmission is unclutched the servo device thereafter trackingly maintains the swash plate at an angle corresponding to the currently existing speed of the output shaft, a source of variable control voltage calibrated in terms of output speed, a first relay having a pushbutton for controlling the same and having contacts, a second relay having contacts, the second relay being connected for closure by a control contact on the first relay, one of the contacts on the second relay being controllingly connected to the clutching valve for clutching the transmission when the relays are energized, other contacts on the second relay being connected as a double-throw switch for switching the input of the servo device from the tachometer to the source of variable control voltage for shockless clutching followed by automatic subsequent change of the speed of the output shaft to the set value.

8. The combination as claimed in claim 7 in which means including a contact on the first relay are provided for reducing the variable control voltage to zero whenever the first relay is de-energized and in which means are provided for energizing the second relay while de-energizing the first relay so that the connected load on the output shaft is braked to a stop.

9. The combination as claimed in claim 7 in which a contact on the first relay bridges the pushbutton for sustained energization of the first relay when the pushbutton is momentarily depressed and in which one of the contacts on the second relay is connected in parallel with the control contact on the first relay so that the second relay remains energized even though the first relay is de-energized during the time that the transmission is braking the load to a stop.

10. The combination as claimed in claim 7 in which means are provided for de-energizing both of the relays after the transmission is clutched to effect declutching accompanied by coasting of the load to rest.

11. In a variable speed drive system, the combination comprising a variable transmission having input and output shafts and including an hydraulically interconnected pump and motor mechanically coupled to the respective shafts as well as a swash plate capable of adjustable angling for varying the speed ratio, a short circuiting conduit in the hydraulic connection, a blocking valve having a blocking member and a spring for moving the member into nonblocking position and having means for admitting pressurized fluid for moving the blocking member into blocking position against the force of the spring, a pump for furnishing pressure fluid to the blocking valve, means including an electric control valve for unloading fluid as long as the control valve is energized, thereby preventing build-up of pressure in the blocking valve and permitting the spring to move the blocking member into a normal unblocking position for declutching of the load, a servo device having an electrical input and a proportionally positioned output member, the output member being connected to the swash plate, means including a tachometer mechanically connected to the output shaft for feeding a tracking signal to the input of the servo device thereafter trackingly maintaining the swash plate at an angle which corresponds to the currently existing speed of the output shaft, a source of settable control voltage calibrated in terms of output speed and means for simultaneously energizing the control valve and for switching the input of the servo device from the tachometer to the source of variable control voltage for shockless clutching of the transmission followed by automatic subsequent change of the speed of the output shaft to the set value.

12. In a variable speed drive system, the combination comprising a variable transmission having input and output shafts including an hydraulically interconnected pump and motor mechanically coupled to the respective shafts as well as a swash plate capable of adjustable angling for varying the speed ratio, a short circuiting conduit interposed in the hydraulic connection, means for opening and closing the short circuiting conduit for respectively unclutching and clutching the transmission, a servo device having an electrical input and a proportionally positioned output member, the output member being connected to the swash plate, means including a tachometer coupled to the output shaft and having an associated amplifier for producing a tracking speed signal, manually adjustable means for producing a control speed signal, control relay means, the control relay means having a contact controllingly connected to the clutching means and having double-throw contacts for alternatively applying the signals to the input of the servo device, the contacts being so arranged that a tracking signal is applied to the servo device whenever the transmission is in the declutched state, and means including manual pushbuttons for sustaining the relay means between its opposite states.

13. In a variable speed drive system, the combination comprising a variable transmission having input and output shafts with a control member for adjustably varying the speed ratio, an electrically operated clutch interposed between the input and output shafts, a servo device having an electrical input and a proportionally positioned output member, the output member being connected to the transmission control member, means including a tachometer coupled to the output shaft and having an associated amplifier for producing a tracking speed signal, calibrated adjustable means for producing a control speed signal, control relay means, the control relay means having a contact controllingly connected to the clutch and having double-throw contacts for alternatively applying the signals to the input of the servo device, the contacts being so arranged that a tracking signal is applied to the servo device whenever the transmission is in the declutched state so that the control member tracks the speed of the output shaft for shockless clutching when the relay means is switched to its clutching state.

* * * * *